United States Patent [19]

Adell

[11] Patent Number: 4,520,594

[45] Date of Patent: Jun. 4, 1985

[54] DOOR EDGE GUARD AND METHOD OF MANUFACTURE

[75] Inventor: Robert Adell, Sunnyvale, Tex.

[73] Assignee: U.S. Product Development Company, Sunnyvale, Tex.

[21] Appl. No.: 533,687

[22] Filed: Sep. 19, 1983

[51] Int. Cl.³ .............................................. E05F 7/00
[52] U.S. Cl. ...................................... 49/462; 52/716; 428/122
[58] Field of Search ........................... 49/462; 52/716; 428/122

[56] References Cited

U.S. PATENT DOCUMENTS

| 3,706,173 | 12/1972 | Taylor | 49/462 X |
|---|---|---|---|
| 4,334,700 | 6/1982 | Adell | 49/462 X |
| 4,372,083 | 2/1983 | Hatzikelis et al. | 49/462 |
| 4,387,125 | 6/1983 | Adell | 49/462 X |

Primary Examiner—Kenneth Downey

Attorney, Agent, or Firm—Stephenson & Boller

[57] ABSTRACT

A method for making an edge guard wherein insulating inserts are fitted onto the beaded ends of the legs of a metal U-shaped edge guard channel with the inserts interlocking with the crevices provided by the beads in certain embodiments. In one embodiment the metal channel is pre-coated with insulation, by spray or roller coating for example, before the insulating inserts are applied. In another embodiment, a one-piece insert is provided which covers the entire exterior of the U-shaped channel, extends around the beads including interlocking portions interlocking with the beads and continues to extend around the beads on the inside of the legs of the channel so as to leave a gap at the base of the inside surface of the channel. The invention provides color-coordination with simplified inventory and manufacturing requirements.

12 Claims, 14 Drawing Figures

DOOR EDGE GUARD AND METHOD OF MANUFACTURE

BACKGROUND AND SUMMARY OF THE INVENTION

This invention relates to edge guards of the type which are applied to the trailing edges of swinging closures such as the trailing edges of automobile doors.

A number of applicant's issued patents and pending applications relate to insulated metal edge guards. Examples of these are disclosed in U.S. Pat. Nos.:
4,259,812
4,316,348
4,334,700
4,338,148
4,365,450
4,377,056
4,379,376
4,379,377
4,387,125
as well as in pending patent applications Self-retaining insulated metal edge guards are advantageous because of the excellent retention, performance, and appearance characteristics. Such insulated metal edge guards have protective insulation disposed between the points at which the self-retention force is applied to opposite sides of the door edge so as to insulate the metal of the edge guard from the painted metal of the door. They also are advantageous in that they permit the exterior of the edge guard to be exposed to view so as to present a bright metallic appearance.

It may be deemed desirable in certain instances to provide a decorative contrast to selected regions of an edge guard, for example, along the outboard edges of the legs of the edge guard. Thin bands running along these regions lengthwise of the edge guard provide a decorative appearance which is desired in certain instances to provide coordination with the metal of the edge guard and/or with the painted door. The color of these bands may be made to match and/or contrast with the color of the door and/or the metal.

The present invention is directed to a new and improved method for making a door edge guard of this type. With the present invention, it is unnecessary to stock various laminated coils of metal, each of which contains a particular color lamination. Rather, the procedure contemplates that only a basic metal edge guard be manufactured and that the decorative material be applied to the edge guard from extruded plastic strips. This saves on the manufacturing and inventory costs associated with manufacturing of edge guards.

According to previous practice, insulated edge guards are manufactured by laminating a sheet of plastic material to a coil of metal, slitting the laminated metal into strips of desired width, and then forming the strips into the desired U-shaped cross section through roll-forming procedures. Where various color properties are desired, it was necessary to fabricate numerous coils of material with the different colors required.

With the present invention, as explained above, the insulated metal channel may be formed into the desired configuration and then subsequently when the desired color characteristics, either matching or contrasting, are chosen, they may be imparted to the metal channel by selection from rolls or strips of extruded vinyl which are then assembled to the edge guard. It is, however, possible to assemble these strips in association with the fabrication procedure for fabricating the metal into the desired cross sectional shape if that is desired.

The invention is disclosed in the ensuring description, claims and accompanying drawings. The drawings disclose a preferred embodiment of the invention according to the best mode contemplated at the present time in carrying out the invention.

DESCRIPTION OF THE PREFERRED EMBODIMENT

Figure 1:
FIGS. 1 and 2 are cross sectional views illustrating the first two steps in the method of the invention.
Figure 2:
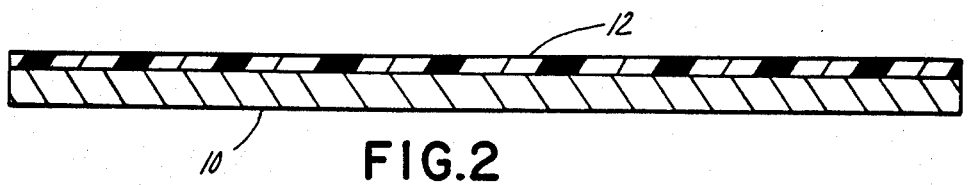

FIGS. 1 and 2 illustrate the first two steps in the method of the invention. The starting point is with a sheet or strip of metal 10. Any suitable metal will do, stainless steel and aluminum being preferred materials.

Figure 3:
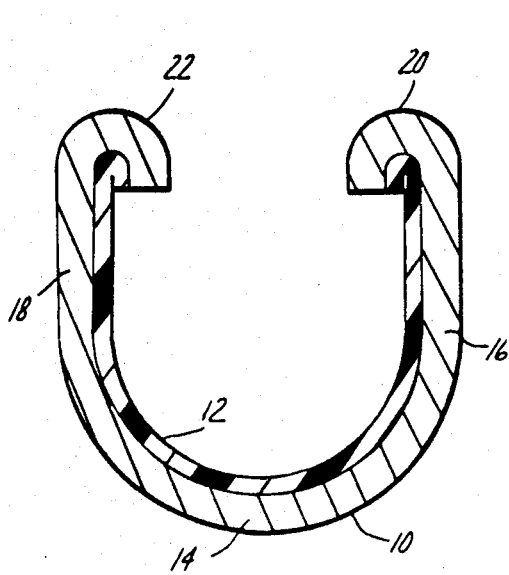
FIGS. 3 and 4 are cross sectional views illustrating further steps.

Applied to one surface of the metal strip 10 is a layer of insulation 12. This insulation layer may be applied in any suitable manner but the preferred technique involves the application by spraying, or roll-coating of a thin film of insulating material. This is the most economical way to achieve the insulation and it does not require the procedure of laminating a sheet of plastic material to the metal as described in other of applicant's patents and patent applications. The material in FIG. 2 is then formed into the desired cross sectional shape such as that shown in FIG. 3. The cross sectional shape illustrated in FIG. 3 is in the form of a general U-shape comprising a semi-circular base 14 and legs 16 and 18 extending away from base 14. The distal end margins of the legs are reverse turned inwardly to form beads 20 and 22 at the distal ends of the respective legs 16 and 18.

The cross section is formed such that the insulation 12 lines the interior of the U-shaped cross section. This insulating material is intended to protect against galvanic action between the metal of the edge guard and the painted metal edge onto which the edge guard is to be installed. It is not necessarily intended to be a cushioning or shock absorbing layer but it could be so if desired. The metal edge guard is of the self-retaining type with the self-retention force being applied by the beads 20 and 22 to opposite sides of the edge on which the edge guard is installed.

Figure 4:
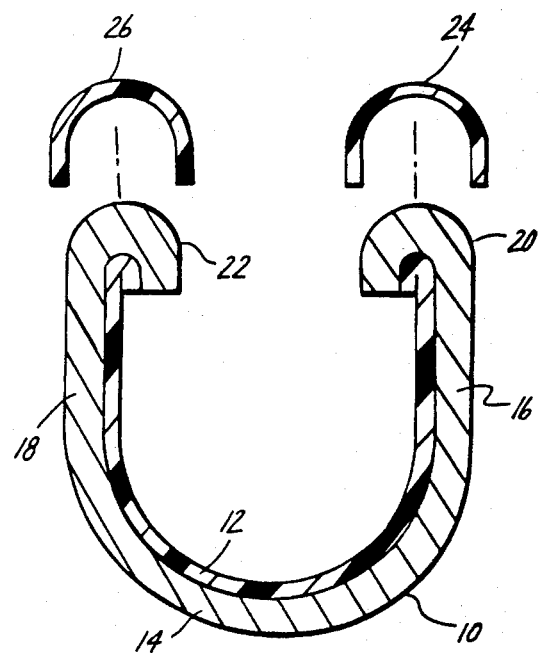

In order to further insulate the metal of the beads from the painted edge and to impart a desired color as explained above, a strip is applied to each of the beads. This is shown in FIG. 4 wherein applied to each bead is an extruded plastic strip 24, 26 having an inverted U- shape corresponding to the shape of the bead. The material is any suitable insulating material, for example, plastic such as polyvinyl chloride. This material comes in extruded form and in various colors so that any desired color may be added to the metal channel as required. It will be noted that because the insulation 12 is on the interior, it has no effect on the outward appearance of the edge guard.

The strips 24 and 26 are preferably secured to the beads by additional means or procedures such as adhesive, or some form of bonding, or even mechanically. The techniques described in other of applicant's issued patents and pending applications may be used for this purpose.

Figure 5:
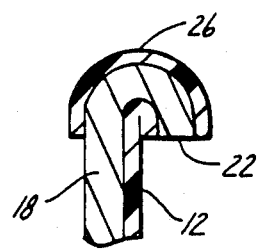
FIG. 5 is an enlarged view of a portion of a completed edge guard.
Figure 5A:
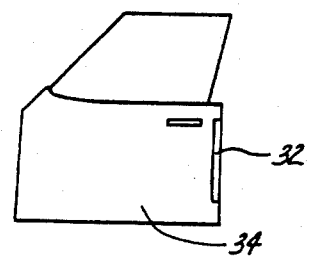
FIG. 5A is a side elevational view of an edge guard installed on the trailing edge of a door.

FIG. 5 is a fragmentary view illustrating the final construction at the end of one of the beads. It can be seen that the insulation covers the beads at the points where they exert self-retention force on the door edge. Also, the inserts extend around onto the outside of the legs so as to present a band of material running along the outboard edges of the legs. In the case of the outboard leg, when the edge guard is installed on a vehicle door edge, this will provide a band of material running along the forward outboard edge of the outer leg which may match and/or contrast with the color of the door and/or the metal of the edge guard. FIG. 5A shows a completed edge guard 32 installed on the trailing edge of a vehicle door 34.

Figure 6:
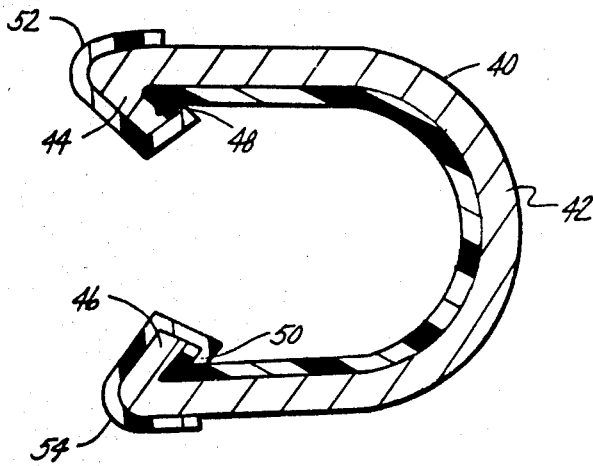
FIG. 6 is a transverse cross sectional view illustrating another embodiment of completed edge guard.

FIG. 6 illustrates another embodiment of edge guard which is constructed in accordance with principles of the invention. This embodiment is designed by the general reference numeral 40 and it comprises a metal U-shaped channel 42 with an insulating layer 12 lining the interior. The ends of the legs are formed with barbs 44, 46 respectively by being reverse turned inwardly to the illustrated configuration. A crevice 48, 50 exists between each inwardly turned barb 44, 46 and the respective leg. Strips for covering the distal ends of the legs, and identified by reference numerals 52, 54 fit onto the ends of the legs. These have the cross sectional shapes illustrated, with one marginal edge fitting into the crevices 48 and 50. Although this serves to mechanically interlock the strips with the respective legs, it is still desirable nonetheless to include an additional means of attachment such as an adhesive or a bonding procedure. The edge guard of FIG. 6 exerts the self-retention force through the protective medium of the strips, yet the strips provide the decorative appearance matching or contrasting with the door and/or metal of the edge guard.

Figure 7:
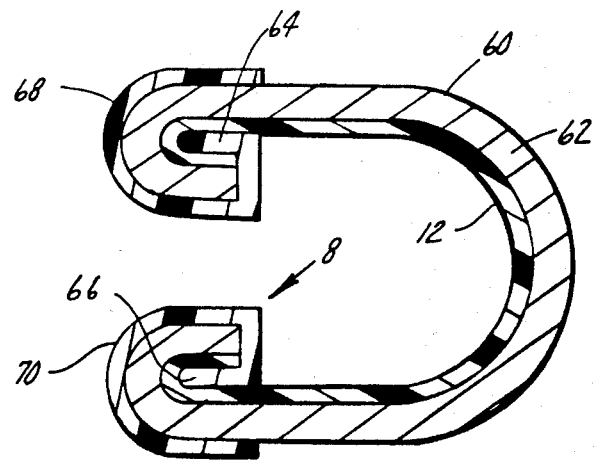
FIG. 7 is a cross sectional view illustrating a third embodiment of completed edge guard.

FIG. 7 illustrates a third embodiment 60. It comprises a metal channel 62 formed to the illustrated cross sectional shape with insulating liner 12 on the interior. The ends of the legs are reverse turned in a different manner from the preceding embodiments so as to leave crevices 64 and 66 more open. The strips 68 and 70 are shaped such that one marginal edge fits into the corresponding crevice. This serves to interlock each strip with each leg. Each strip wraps fully around to the outside so as to present the decorative contrasting and/or matching appearance on the outside of the leg. Once again it is preferable to use an additional attachment means and/or procedure to secure the strips in place. It would also be possible if desired to subject the metal to a further operation after the inserts have been installed by further closing the inwardly turned beads to in effect clamp the edges of the strips which are inserted into the crevices 64 and 66. This could provide a more forceful retention.

Because the metal edge guard is often contoured to conform to a sweep or contour in the door edge, it may be desirable to include provisions in the strips which would be useful in more closely conforming the inserts to the curvature at the distal ends of the legs which follow the curvature of the door.

Figure 8:
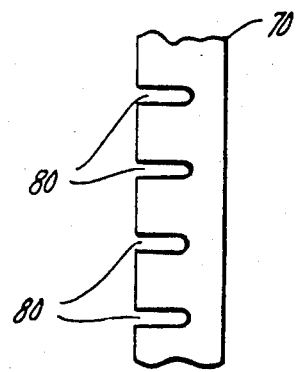
FIG. 8 is a fragmentary view looking in the direction of arrow 8 in FIG. 7 and enlarged.
Figure 9:
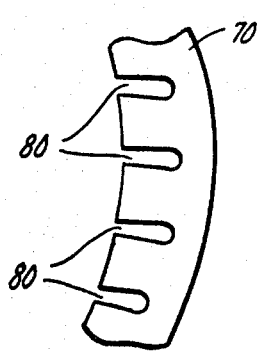
FIG. 9 is a view similar to FIG. 8.

FIG. 8 illustrates the free condition of a typical insert in which the region of the insert which extends into the crevice and around the bead is provided with a series of notches 80 at suitable intervals along the length. The notches allow the insert to be conformed to a contour such as that depicted in FIG. 9 and/or in a plane which is perpendicular to the plane of the sheet containing FIG. 9. The shape, size and even the necessity of notches will depend upon the nature of the particularly requirements meaning the dimensions involved and the extent of the contour. It is possible that the notches may extend only partially into the insert of they may extend even more fully into the crown where it wraps around the end of the leg.

Figure 10:
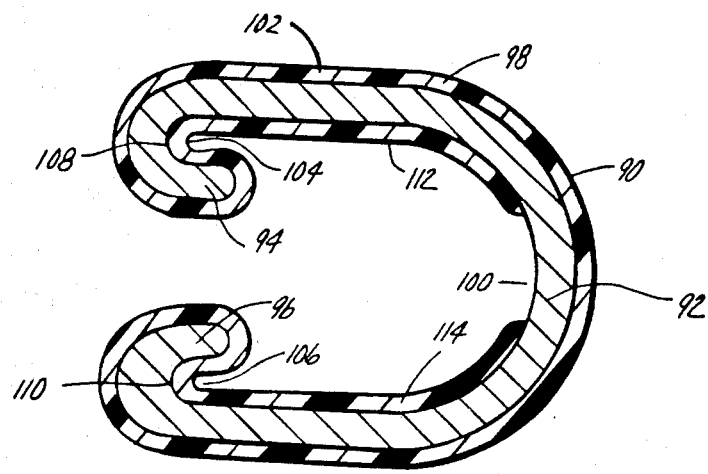
FIG. 10 is a cross sectional view of a further embodiment of edge guard.

FIG. 10 illustrates a further embodiment of edge guard 90. Edge guard 90 comprises a metal channel 92 formed into a general U-shape with the ends of the legs being turned inwardly to form beads 94 and 96. A one piece insulating insert 98 is fitted onto the metal channel and is in the form of a separate extrusion. The insulating insert 98 covers the entirety of the cross section except for a gap 100 on the interior of the U-shaped channel at the base.

The insulating insert comprises a U-shaped exterior portion 102 for the exterior of the metal channel. This U-shaped exterior portion continues around the beads at the distal ends of the legs of the metal channel and includes interlocking portions 104, 106 respectively which interlock within the crevices 108, 110 between the beads 94, 96 and respective legs of the metal channel. From these interlocking portions, the insulating insert continues along the inside of each leg at 112, 114 respectively and partially extends into the base of the U leaving the gap 100.

The insulating insert is extruded to a shape which allows it to be fitted onto the metal channel so as to interlock the portions 104, 106 with the respective crevices 108, 110. The insert could be extruded to substantially the illustrated cross sectional shape or it could be extruded to a somewhat different shape. For example, instead of extruding the insert to the illustrated cross sectional shape, it could be extruded with a difference shape so as to require folding about the base of the U and in this way it could exert its own self-retention force when assembled onto the metal channel.

Figure 11:
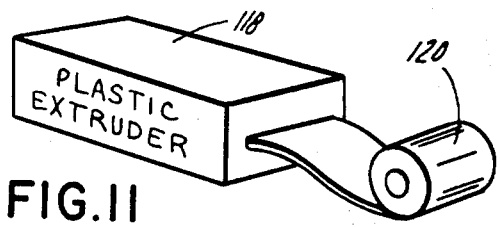
FIGS. 11, 12 and 13 are perspective views illustrating portions of respective procedures for fabricating edge guards.
Figure 12:
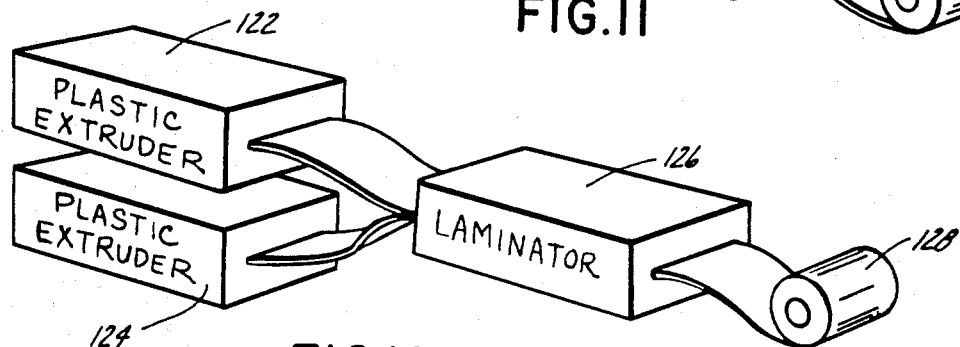
Figure 13:
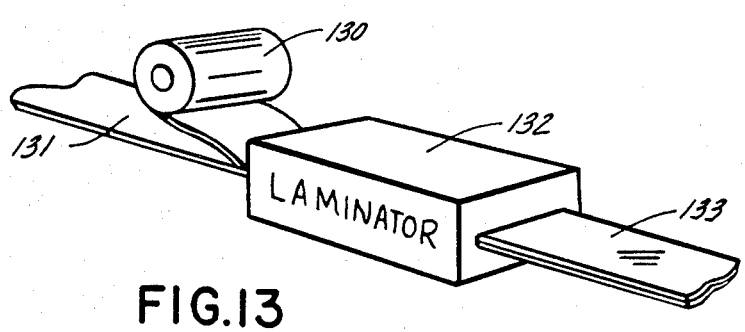

FIGS. 11, 12 and 13 illustrate steps in manufacturing procedures which illustrate economy in the manufacturing procedure.

FIG. 11 illustrates plastic material for use in insulating the metal edgeguard being obtained from an extruder 118. The material is wound into rolls 120 and the rolls may be manufactured in desired colors. When a particular color is needed, material is taken from the roll of that color.

FIG. 12 illustrates a procedure in which two plastic extruders 122, 124 provide two different extrusions which are laminated together by a laminator 126 and with the laminated material being wound into a roll 128.

FIG. 13 illustrates plastic material being taken from a roll 130 and laminated onto metal 131 by a laminator 132 to form a laminated metal 133.

For the FIG. 10 embodiment care should be taken in selection of the material of the metal of the edge guard and its installation because the interior is not fully lined with insulation by virtue of the gap 100. FIG. 10 shows one specific embodiment and for any given embodiment dimensions of the insert may be adjusted as appropriate for fabrication and installation purposes.

While a preferred embodiment has been disclosed, it will be appreciated that principles are applicable to other embodiments.

What is claimed is:

1. The method of making an edge guard of the type comprising a metal strip formed into a U-shaped cross section having inner and outer legs, said method comprising applying a layer of insulation to one surface of a metal strip, forming the strip into the general U-shaped cross section of the edge guard to dispose the insulation of the interior, inwardly turning the distal marginal edge of at least one of the legs of the edge guard so that bare metal id disposed at the interior surface of the bead thus formed and a crevice is provided between each such bead and the corresponding leg, and applying a non-metallic strip over the distal end margin of said at least one leg and its bead, said non-metallic strip covering both the inwardly facing surface of the bead onto which it is applied as well as an immediately adjacent portion of the exterior of the corresponding leg of the U-shaped cross section, and disposing a marginal edge of said strip in said crevice.

2. A method as set forth in claim 1 in which a further operation is conducted on said at least one bead after said marginal edge of said strip has been inserted within said crevice so as to forcefully close the bead onto said marginal edge of said strip.

3. A method as set forth in claim 1 further including the step of adhering said strip to said at least one bead.

4. A method as set forth in claim 3 in which the adhering of the strip to said at least one bead is accomplished by means of an adhesive applied between the strip and said at least one bead.

5. A method as set forth in claim 3 in which the adhering of said strip to said at least one bead is accomplished by heating of the material of the strip to bond it to the at least one bead.

6. A method as set forth in claim 1 in which notches are formed in said strip to facilitate conformance of the strip to curvature of the edge guard.

7. An edge guard made by the method of claim 1.

8. An edge guard comprising a metal channel formed into a generally U-shaped cross section to provide inner and outer legs, beads formed at the distal ends of said legs, crevices between said beads and legs, and a one-piece insulating insert applied onto said metal channel, said insert comprising a continuous outer portion for covering the exterior of the U-shaped metal channel and interior portions covering at least portions of the interior surfaces of the legs but having a gap between said interior portions to leave a portion of the interior surface of the metal uncovered by said insert, and said insert including means for interlocking with said beads and fitting within said crevices.

9. An edge guard as set forth in claim 8 in which said beads are turned inwardly.

10. An edge guard as set forth in claim 8 in which said U-shaped cross section has a generally semi-circular base with said legs extending away from said base on opposite sides and wherein the interior portions of said insert extend to cover portions of said base.

11. An edge guard as set forth in claim 8 in which said insert is extruded to a cross sectional shape before its assembly to the metal channel with the cross sectional shape of the insert differing from that of the metal channel so as to require a folding of the insert to interlock with the beads of the metal channel.

12. In an insulated door edge guard of the type comprising a generally U-shaped channel having inner and outer legs and a bead at the distal end of at least one of said legs, the improvement wherein a crevice is provided between the bead and the corresponding leg and an insulating insert is fitted over the bead and includes a reverse turned margin fitting into said crevice.

* * * * *